(12) United States Patent
Chopra et al.

(10) Patent No.: US 10,754,750 B1
(45) Date of Patent: Aug. 25, 2020

(54) METHOD AND SYSTEM FOR COLLECTING MONITORING INFORMATION AND PROVIDING VISUAL REPRESENTATION OF SAME

(71) Applicant: EMC IP Holding Company LLC, Hopkinton, MA (US)

(72) Inventors: Shelesh Chopra, Bangalore (IN); Gururaj Kulkarni, Bangalore (IN); Harish Jayaram, Bangalore (IN); Ramkumar Seetharaman, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 372 days.

(21) Appl. No.: 15/608,805

(22) Filed: May 30, 2017

(51) Int. Cl.
*G06F 11/30* (2006.01)
*G06F 11/34* (2006.01)
*G06F 16/904* (2019.01)

(52) U.S. Cl.
CPC ...... *G06F 11/3096* (2013.01); *G06F 11/3006* (2013.01); *G06F 11/3017* (2013.01); *G06F 11/3409* (2013.01); *G06F 16/904* (2019.01)

(58) Field of Classification Search
CPC .............. G06F 16/904; G06F 11/3409; G06F 11/3017; G06F 11/3006; G06F 11/3096
See application file for complete search history.

(56) References Cited

U.S. PATENT DOCUMENTS

| 2013/0343201 | A1* | 12/2013 | Desroches | H04L 41/5067 370/242 |
| 2014/0149491 | A1* | 5/2014 | Rivadalla | H04W 4/029 709/203 |
| 2018/0074855 | A1* | 3/2018 | Kambatla | G06F 9/4881 |

* cited by examiner

*Primary Examiner* — Austin J Moreau
(74) *Attorney, Agent, or Firm* — Womble Bond Dickinson (US) LLP

(57) ABSTRACT

According to some embodiment, first aggregated monitoring information collected from a first system and second aggregated monitoring information collected from a dedicated system over a time period are retrieved from the dedicated system at a retrieving rate. The first aggregated monitoring information and second aggregated monitoring information are archived into a database. The first aggregated monitoring information and second aggregated monitoring information from the database are retrieved and analyzed. Visual representation of the analyzed information associated with the first aggregated monitoring information and second aggregated monitoring information are provided.

20 Claims, 13 Drawing Sheets

```
var spawn = require('child_process').spawn;

var intObj;
var check,ptime;

process.stdin.setEncoding('utf8');
process.stdin.on('readable', function() {
    var chunk = process.stdin.read();
    if(chunk!=null){
        chunk = JSON.parse(chunk.toString());
        if (chunk.comm == 'start') {
            check = chunk.daemons;
            ptime = chunk.interval;
            intObj=setInterval(ping,ptime);
        }
        else if (chunk.comm == 'stop') {
            clearInterval(intObj);
        }
        else{
            process.stdout.write('wrong value: ' + chunk);
        }
    }
});
```

FIG. 5

```
{
    host: "backup server",
    timestamp: 1454473916128,
    daemon: "backupd",
    property: "memory",
    type: "average",
    value: 23,
    metric: "MB"
}
```

METHOD AND SYSTEM FOR COLLECTING MONITORING INFORMATION AND PROVIDING VISUAL REPRESENTATION OF SAME

RELATED APPLICATIONS

This application is related to co-pending U.S. patent application Ser. No. 15/608,800, filed May 30, 2017, titled "Method and System for Multi-Node Monitoring Services," now U.S. Pat. No. 10,657,019, issued May 19, 2020. The disclosure of the above application is incorporated by reference herein in its entirety.

FIELD OF THE INVENTION

Embodiments of the present invention relate generally to data storage systems. More particularly, embodiments of the invention relate to method for providing monitoring services of one or more data processing systems.

BACKGROUND

Resource monitoring and analysis of enterprise application performance is carried out using a combination daemon resource values and operational metadata. Daemon resources are gathered using dedicated tools or via operating system (OS) commands in custom-scripts. Operational metadata is obtained from application log files.

Performance analysis of enterprise solutions is a much more complicated task. These solutions represent multiple enterprise applications (deployed on different host machines) working together to provide the necessary services. To gather daemon values, one must either run monitoring tools on each machine and infer the results manually or one must use heavyweight networked monitoring tools. Running these tools, however, causes higher resource utilization on the host machines, leading to performance degradation.

BRIEF DESCRIPTION OF THE DRAWINGS

Embodiments of the invention are illustrated by way of example and not limitation in the figures of the accompanying drawings in which like references indicate similar elements.

FIG. 5 is an example of programming instructions for a microservice according to one embodiment of the invention.

FIG. 6 is an example of a data format for storing information in a log file according to one embodiment of the invention.

DETAILED DESCRIPTION

Figure 1:
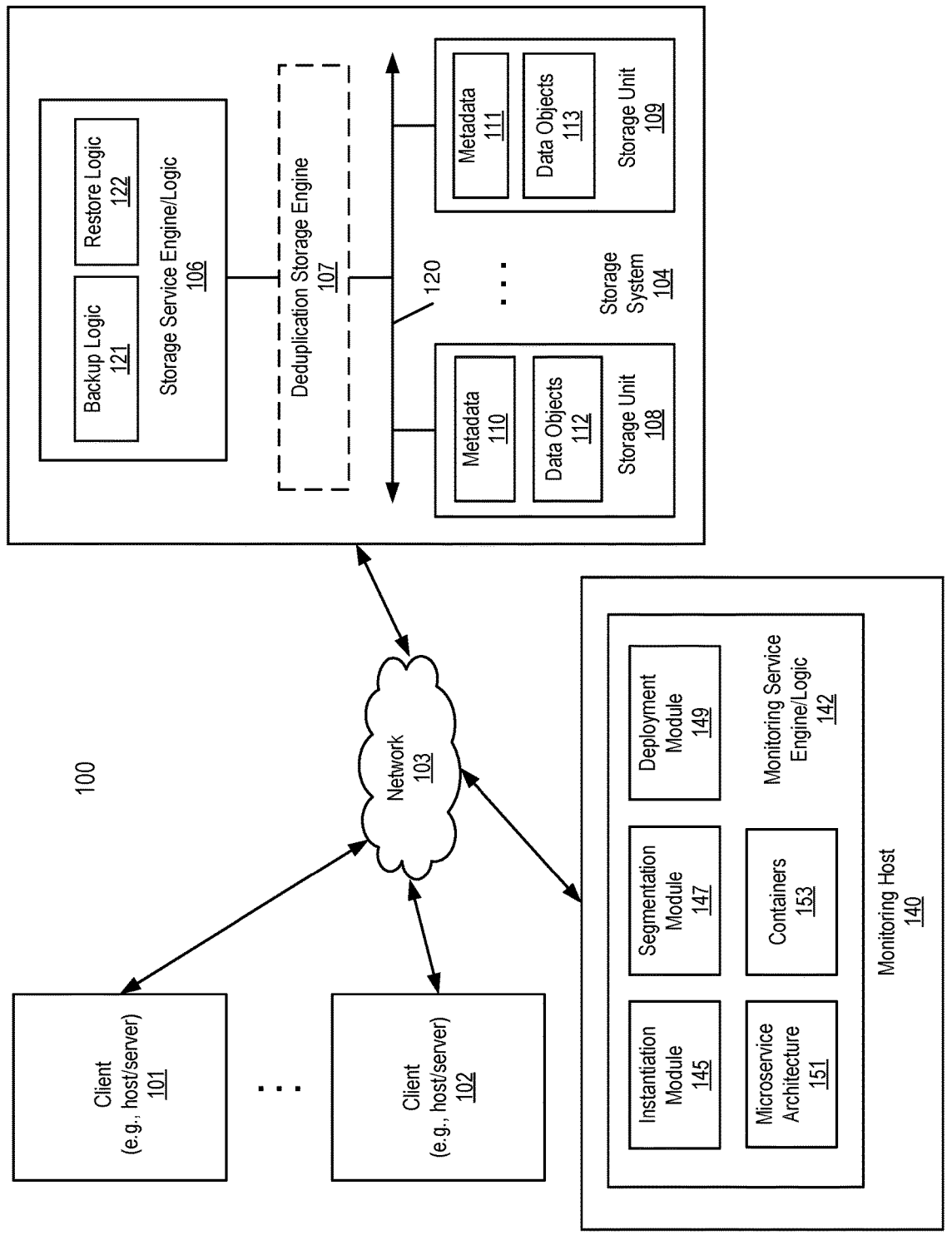
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to some embodiments, light-weight processes are deployed to monitor and aggregate data from multiple hosts on an on-demand basis. These processes are scalable and modular, and can be deployed as both standalone services/tools or inbuilt modeling in a product. Additionally, there are various resources and services that are desirably monitored, but most of the existing implementation rally around a very integrated/heavily modeled approach. Accordingly, there is a need for an algorithm or a model (e.g., Directed Acyclic Graph) that is a light-weight distributed model based on microservices.

According to one aspect of the invention, a microservice architecture is instantiated in accordance with a predefined framework to perform monitoring services of a first system (e.g., client 101/102) and a second system (e.g., storage system 104). The microservice architecture includes one or more microservices. The microservice architecture is segmented into groups of microservices. Each group of microservices is represented by a subset of the predefined framework. A first group of microservices is deployed to the first system, and a second group of microservices is deployed to the second system.

In one embodiment, the first group of microservices includes a first microservice that collects resource information from the first system, and a second microservice that aggregates the collected resource information received from the first microservice into a first log file that is locally stored in the first system. The second group of microservices includes a first microservice that collects resource information from the second system, a second microservice that collects log information from the second system, and a third microservice that aggregates the collected resource and log information received from the first and second microservices into a second log file that is locally stored in the second system.

In one embodiment, a third group of microservices is deployed and executed. The third group of microservices includes a first micro service that respectively retrieves the first and second log files from the first and second systems, and archives information in the first and second log files, a second microservice that performs analytics on the archived information, and a third microservice that provides visual representation of the analyzed information.

According to another aspect of the invention, first aggregated monitoring information collected from a first system (e.g., any of clients 1001-1004) and second aggregated monitoring information collected from a dedicated system (e.g., client 1010/1020) over a time period are retrieved from the dedicated system at a retrieving rate. The first aggregated monitoring information and second aggregated monitoring information are archived into a database. The first aggregated monitoring information and second aggregated monitoring information are retrieved and analyzed from the database. Visual representation of the analyzed information associated with the first aggregated monitoring information and second aggregated monitoring information are provided.

In one embodiment, in response to a user request to provide visual representation of monitoring information of the first system in real-time, a request having an input parameter that configures one or more microservices in the first system to collect and aggregate monitoring information of the first system in real-time is sent to the first system. Real-time aggregated monitoring information from the first system are received. Visual representation of analyzed information associated with the real-time aggregated monitoring information are provided.

In one embodiment, whether the monitoring services are complete is determined. If the monitoring services are complete, fourth aggregated monitoring information collected from the first system over a duration of the monitoring services are retrieved from the first system. Fifth aggregated monitoring information collected from the dedicated system over the duration of the monitoring services are retrieved from the dedicated system. Sixth aggregated monitoring information collected from the second system over the duration of the monitoring services are retrieved from the second system.

FIG. 1 is a block diagram illustrating a system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Any of clients 101-102 and storage system 104 can be configured as virtualized platforms hosting one or more virtual machines to provide virtualized storage services in the cloud. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up or replicate data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

A deduplication key uniquely identifies a data block by storing information (such as logical address, physical address) of the data block. Deduplication logic 107 identifies data blocks that can potentially be deduplicated by comparing digests of data blocks with list of digests stored in the index table. Further, when data blocks are deduplicated after comparing digest information, deduplication logic 107 updates metadata of deduplicated data blocks. Additionally, deduplication logic 107 updates metadata of a data block when the data block is reduplicated.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In one embodiment, system 100 further includes a monitoring host 140 that is communicatively coupled to clients 101-102 and storage system 104 over network 103. Monitoring host 140 may communicate with clients 101-102 and storage system 104 using any standard input/output (I/O) protocol, for example hypertext transfer protocol (HTTP). Monitoring host 140 may serve to provide monitoring and analysis services to clients 101-102 and storage system 104. Monitoring host 140 may be a host or server, or a personal computer (e.g., desktops and laptops), a "thin" client, a personal digital assistant (PDA), a Web enabled appliance, or a mobile device (e.g., Smartphone, tablets), etc. Referring to FIG. 1, monitoring host 140 includes a monitoring service engine (or monitoring service logic) 142 that is configured to perform resource monitoring services of clients 101-102 and storage system 104. Monitoring service engine 142 may also perform analytics on gathered or collected resource information from the clients 101-102 and storage system 104, and provide visual representation of the analyzed data and/or collected resource information via a user interface (UI). As shown, the monitoring service engine 142 includes instantiation module 145, segmentation module 147, and deployment module 149.

Instantiation module 145 is configured to create or instantiate microservice architecture 151 based on a predefined framework for resource monitoring. Microservice architecture 151 may include a collection of microservices represented by the predefined framework (e.g., a graph). Each microservice may include a set of predetermined inputs and outputs, run a unique process and communicate through a lightweight mechanism. A microservice, for example, refers to an independently deployable, modular service configured to perform one or more specific functions.

Segmentation module 147 is configured to segment or divide the microservice architecture 151 (i.e., the collection of microservices) into subsets or groups of microservices for deployment to one or more systems (e.g., clients 101-102 and storage system 104). Each subset of microservices may be represented by a subset of the framework. For instance, the subsets of microservices may include a first subset having microservices that perform monitoring services specific to clients 101-102 (e.g., resource information collection), a second subset having microservices that perform monitoring services specific to storage system 104 (e.g., resource and log information collection), and a third subset having microservices that archive information collected from clients 101-102 and storage system 104, perform analytics on the collected information, and provide visual representation of the analyzed and/or collected information to a UI.

Deployment module 149 is configured to package and deploy the subsets of microservices to various systems, such as clients 101-102 and storage system 104, over network 103. For example, deployment module 149 may package the subsets of microservices into containers 153 (e.g., TAR/ZIP, or open virtualization format (OVF) file) and deploy each container to a destination system (e.g., clients 101-102, storage system 104, or monitoring host 140) where the microservices may be executed. In some embodiments, certain container, such as containers being deployed to clients 101-102 and storage system 104, may also include a service manager that manages the particular subset of microservices within the container. The service manager, for example, may monitor the state of each microservice instance (e.g., service start, service stop, service crash or fail) on a periodic basis, and report the state of each microservice to monitoring service engine 142 (which may be referred to as "master service" in some embodiments) to react or respond accordingly, if needed. For example, in the event a microservice crashes, monitoring service engine 142 may re-deploy or re-launch that microservice (e.g., deploying one of containers 153) and configure the microservice based on its last saved state.

Figure 2:
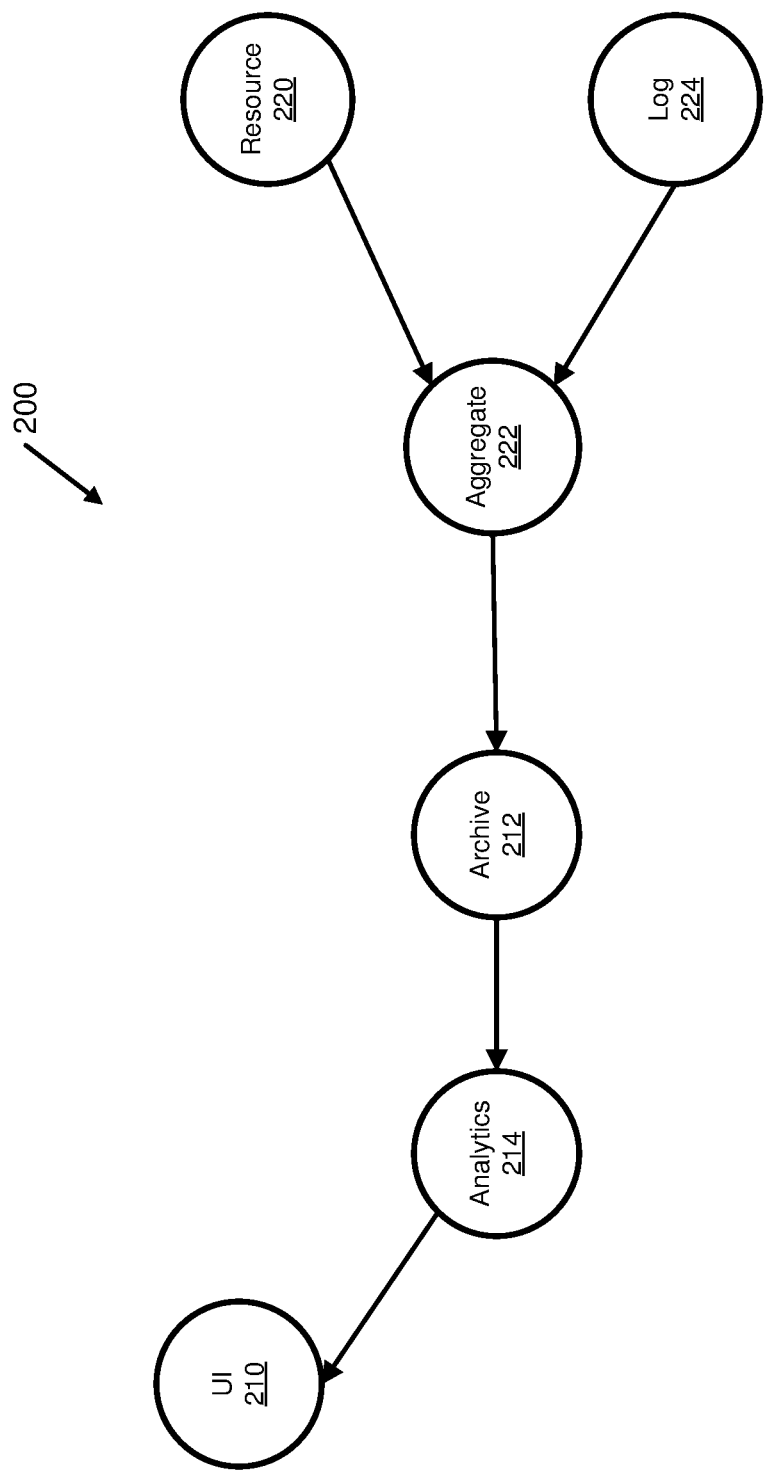
FIG. 2 is a block diagram illustrating a microservice architecture according to one embodiment of the invention.

FIG. 2 is a block diagram illustrating a microservice architecture according to one embodiment of the invention. In FIG. 2, microservice architecture 200 is represented by a framework, for example directed acyclic graph (DAG). The framework, in some embodiments, may be predefined by a user or provided through a driver of computer software. The framework includes multiple nodes or vertices, with each node representing a microservice and each edge representing data stream being communicated between a pair of nodes. Accordingly, as shown, microservice architecture 200 includes resource node 220, aggregate node 222, log node 224, archive node 212, analytics node 214, and UI node 210.

Resource node 220 may represent a microservice that gathers or collects resource information of a particular system (e.g., clients 101-102 and storage system 104). Resource information may include, for example, central processing unit (CPU) time (e.g., time on a single CPU and use of multiple CPUs) and CPU utilization, memory (e.g., random access memory and virtual memory usage), hard disk drives (e.g., free space), cache space (e.g., CPU cache), network throughput, and input/output (I/O) operations. Log node 224 may represent a microservice that collects log information of a backup system (e.g., storage system 104). Log information, for example, may include information from a server log containing a list of activities a backup system (e.g., storage system 104) performed. Aggregate node 222 may represent a microservice that aggregates data collected from resource node 220 and log node 224 into a log file that is locally stored. Archive node 212 may represent a microservice that retrieves the log file from aggregate node 222 and archives data from the log file, for example, into a database. Analytics node 214 may represent a microservice that performs analytics on the archived data retrieved from the database and provides analyzed information (e.g., mean, maximum, minimum, percentile and/or standard deviation of resource data for a given period of time) to UI node 210, which may represent a microservice that displays or provides visual representation of the information. In some embodiments, the UI node 210 may directly retrieve the archived data from archive node 212 to display the archived data.

Figure 3:
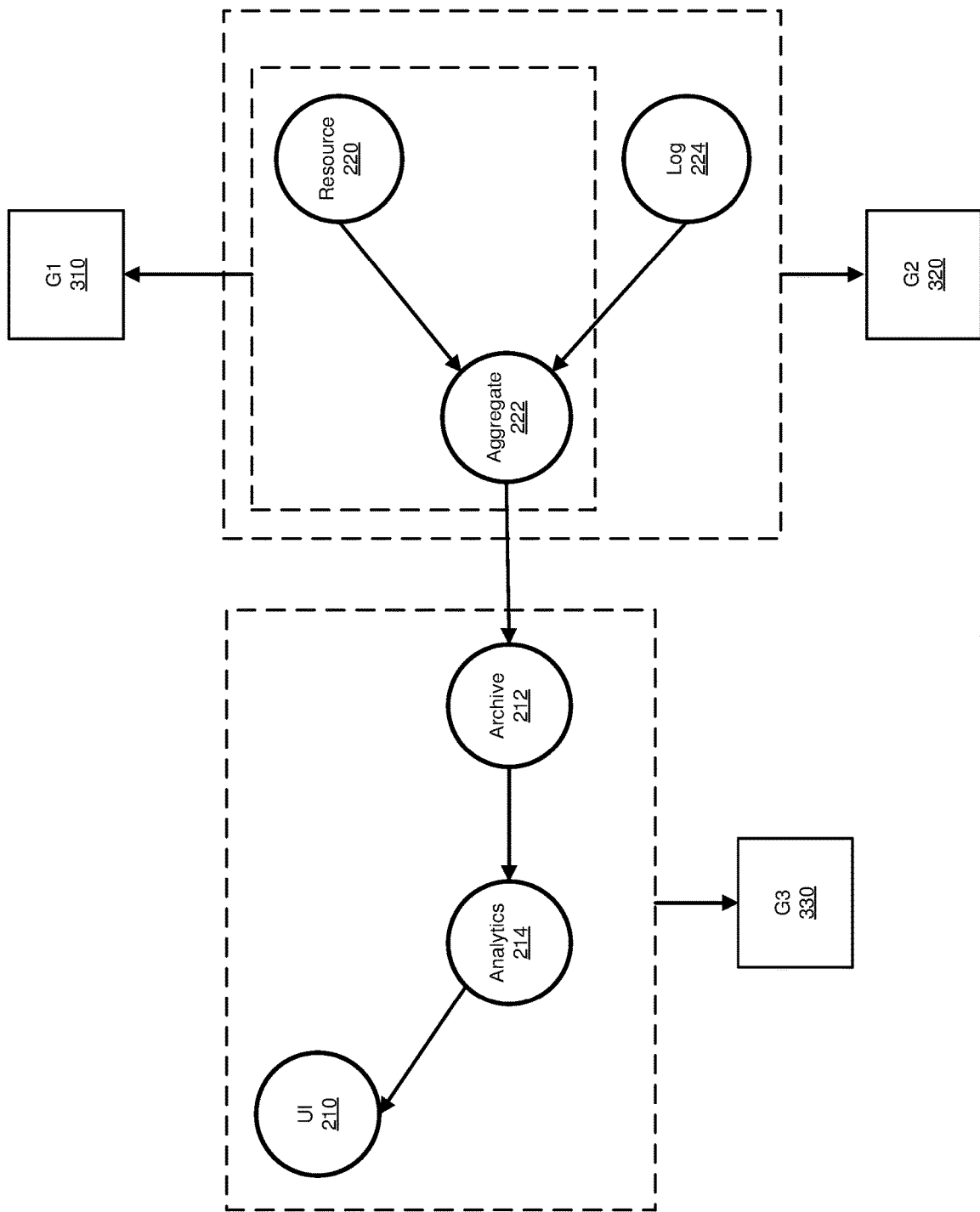
FIG. 3 is a block diagram illustrating segmentations of a microservice architecture into subsets of microservices according to one embodiment of the invention.

FIG. 3 is a block diagram illustrating segmentations of a microservice architecture into subsets of microservices according to one embodiment of the invention. For instance, a user or driver of a computer software may provide deployment information that determines a particular method to segment microservice architecture 200. In this case, referring to FIG. 3, the microservice architecture 200 may be segmented into three subsets or groups of microservices for deployment. As shown, resource node 220 and aggregate node 222 are divided into a first microservice group 310 (which may be referred to as "G1"). Resource node 220, log node 224, and aggregate node 222 are divided into a second microservice group 320 (which may be referred to as "G2"). Lastly, archive node 212, analytics node 214, and UI node 210 are divided into a third microservice group 330 (which may be referred to as "G3"). Accordingly, each of the first microservice group 310, second microservice group 320, and third microservice group 330 is represented by a subset of the framework that represents the microservice architecture 200.

Figure 4:
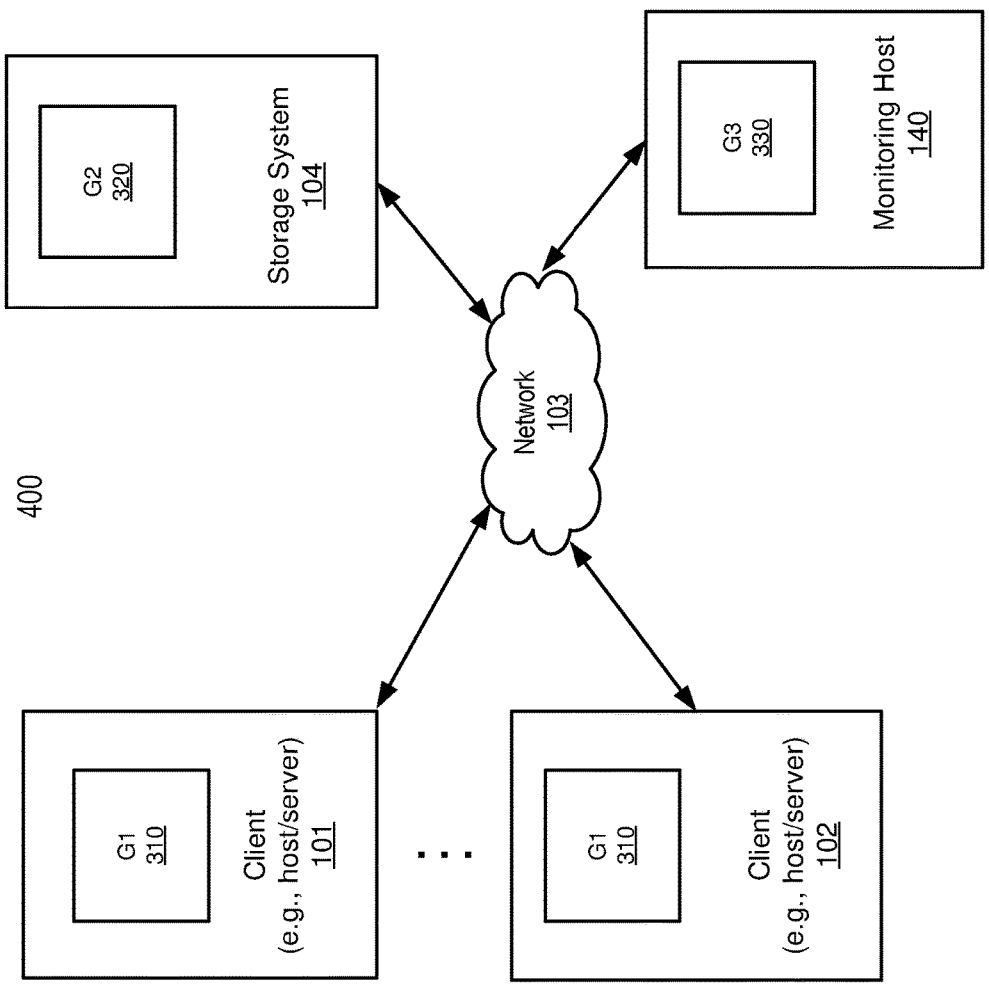
FIG. 4 is a block diagram illustrating an exemplary system with deployed microservice groups according to one embodiment of the invention.

Referring to FIG. 4, a block diagram illustrating an exemplary system 400 with deployed microservice groups according to one embodiment of the invention. In FIG. 4, as an example, G1, G2 and G3 may be respectively deployed to clients 101-102, storage system 104, and monitoring host 140 over network 103. In some embodiments, if an additional system (e.g., a client or storage system) is added to system 400 to receive monitoring and analysis services, G1 or G2 may also be deployed to that particular system, for example by monitoring host 140, to perform the services. For instance, if a request is received (e.g., by monitoring host 140) from the additional system to provide monitoring and analysis services on that additional system, as with clients 101-102 and storage system 104, monitoring host 140 may further deploy G1 or G2 to the system to perform the services. Accordingly, system 400 is scalable and modular as the number of clients and/or storage system grows.

In some embodiments, G1, G2 and G3 may be packaged within containers prior to deployment. For example, G1 and G2 may each be packaged within a TAR/ZIP file, and G3 may be packaged in an OVF file, with the TAR/ZIP files being deployed, for example, to clients 101-102 and OVF file being deployed, for example, to monitoring host 140. In addition to G1 or G2, in some embodiments, the TAR/ZIP file may further include a service manager that monitors and reports the state of each microservice instance within G1 or G2, as previously described. In some embodiments, G3 (or the OVF file) may include a database for storing archived data (e.g., MongoDB), an application program interface (API) for receiving and/or retrieving data among microservices (e.g., representational state transfer (REST) API), and a UI microservice for displaying information (e.g., analyzed and/or archived information).

Once deployed, the containers (e.g., TAR/ZIP and OVF files) may be unpackaged to obtain the objects within them. For example, a TAR/ZIP file may be unpackaged or unzipped in clients 101-102 to install G1 and its associated service manager. Another TAR/ZIP file may be unpackaged in storage system 104 to install G2 and its associated service manager. And the OVF file may be run in a virtual machine (VM) in monitoring host 140 to install G3 (e.g., the database, API and UI microservice). Subsequently, the monitoring host 140 (or VM) may configure the microservices (i.e., G1 or G2) on clients 101-102 and storage system 104. For example, monitoring host 140 may send a request (e.g., POST request) to clients 101-102 and storage system 104 with requisite input parameters to configure the microservices (e.g., G1 and G2) installed in those systems. The input parameters may include an address of monitoring host 140 (e.g., for the microservices to transmit data), type of performance data on a particular system to monitor (e.g., CPU, memory, network, or I/O), and sampling time (e.g., every one minute or less, every 15 minutes, or every 30 minutes or more) indicative of a collection rate for collecting the performance data.

Referring to FIG. 5, an example of programming instructions for a microservice according to one embodiment of the invention. Generally, a microservice may be programmed or coded in any programming language (e.g., C, C++, C #, JavaScript, or any scripting language). In the example of FIG. 5, the microservice is written in JavaScript, and the microservice may be any microservice, as previously described for example in FIG. 2.

Referring to FIG. 6, an example of a data format for storing information in a log file according to one embodiment of the invention. As previously discussed in FIG. 2, aggregate node 222 may represent a microservice that aggregates data collected from resource node 220 and log node 224 into a log file that is locally stored. Data in the log file may be stored in accordance with the data format as shown in FIG. 6 (e.g., JavaScription Object Notation (JSON) format).

Figure 7:
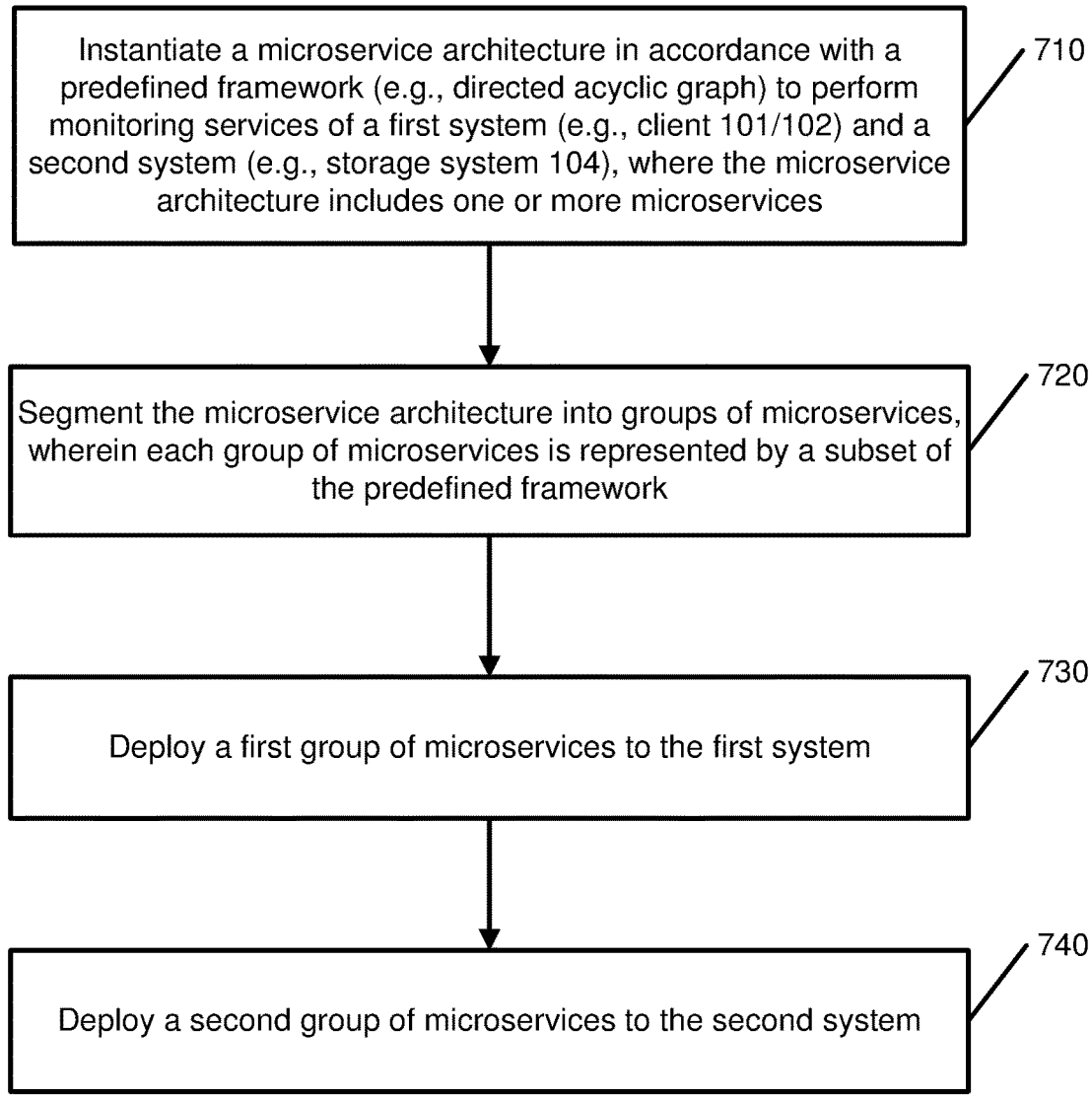
FIG. 7 is a flow diagram illustrating a method to provide monitoring services of one or more data processing systems according to one embodiment of the invention.

FIG. 7 is a flow diagram illustrating a method to provide monitoring services of one or more data processing systems according to one embodiment of the invention. Process 700 may be performed by processing logic that includes hardware (e.g. circuitry, dedicated logic, etc.), software (e.g., embodied on a non-transitory computer readable medium), or a combination thereof. For example, process 700 may be performed by monitoring service engine 142 of FIG. 1. Referring to FIG. 7, at block 710, processing logic instantiates a microservice architecture in accordance with a predefined framework to perform monitoring services of a first system and a second system, where the microservice architecture includes a plurality of microservices. At block 720, the processing logic segments the microservice architecture into groups of microservices, where each group of microservices is represented by a subset of the predefined framework. At block 730, the processing logic deploys a first group of microservices to the first system. At block 740, the processing logic deploys a second group of microservices to the second system.

Figure 8:
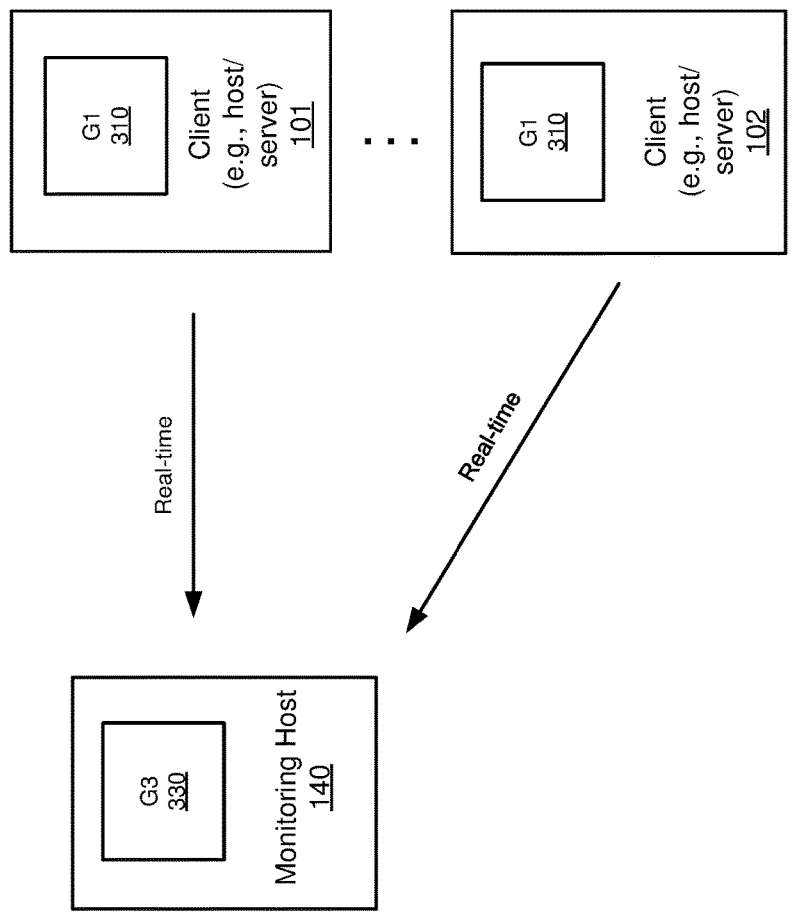
FIG. 8 is a block diagram illustrating a system for providing real-time monitoring information according to one embodiment of the invention.

FIG. 8 is a block diagram illustrating a system for providing real-time monitoring information according to one embodiment of the invention. Monitoring information, for example, may be resource and/or log information as previously discussed. Turning to FIG. 8, system 800 includes clients 101-102 and monitoring host 140. Clients 101-102 may employ G1 and monitoring host may employ G3. As shown, each of clients 101-102 may communicate monitoring data to monitoring host 140 in real-time. For example, monitoring host 140 may send a request (e.g., POST request) to each of clients 101-102 with input parameters to configure each microservice deployed in the client. The input parameters, for example, may include a sampling time that triggers the microservices (e.g., G1) running on the client to gather resource or performance information, and aggregate the information into a log file in real-time, such as every one minute or less. Accordingly, the monitoring host 140, for example via microservices represented by G3, may retrieve or receive the log file (e.g., using an API such as REST API) from each of clients 101-102 in real-time for archiving, analyzing, and visually representing the information. In some embodiments, instead of retrieving or receiving the log file, monitoring host 140 may directly receive the information from clients 101-102 in real-time.

Figure 9:
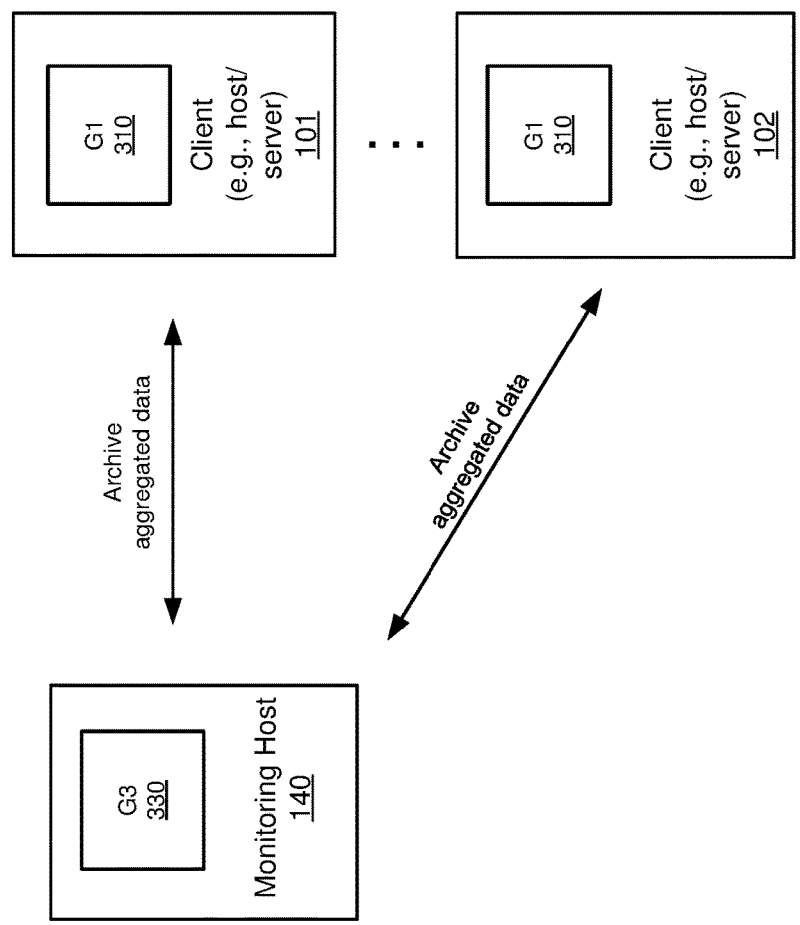
FIG. 9 is a block diagram illustrating a system for providing archived monitoring information according to one embodiment of the invention.

FIG. 9 is a block diagram illustrating a system for providing archived monitoring information according to one embodiment of the invention. In FIG. 9, system 900 (similar to system 800 of FIG. 8) also includes clients 101-102 and monitoring host 140. Monitoring host 140 may send a request to each of clients 101-102 with input parameters that include a sampling time that triggers the microservices (e.g., G1) running on the client to gather resource information, and aggregate the information into a log file at a collection rate (e.g., every one minute or less, 15 minutes, or 30 minutes or more). In this scenario, however, the monitoring host 140 does not retrieve the log file of each of clients 101-102 in accordance with the sampling time. Instead, the monitoring host 140 retrieves or receives the log files from clients 101-102 upon completion of the monitoring services (e.g., when the resource information collection and aggregation microservices from clients 101-102 stop running) and archives information in the log files, for example, in a database for further processing (e.g., analysis and/or visual representation). In some embodiments, the monitoring services may run for a duration, such as 30 minutes or more, and therefore the log files may reflect data collected over such time period.

Figure 10:
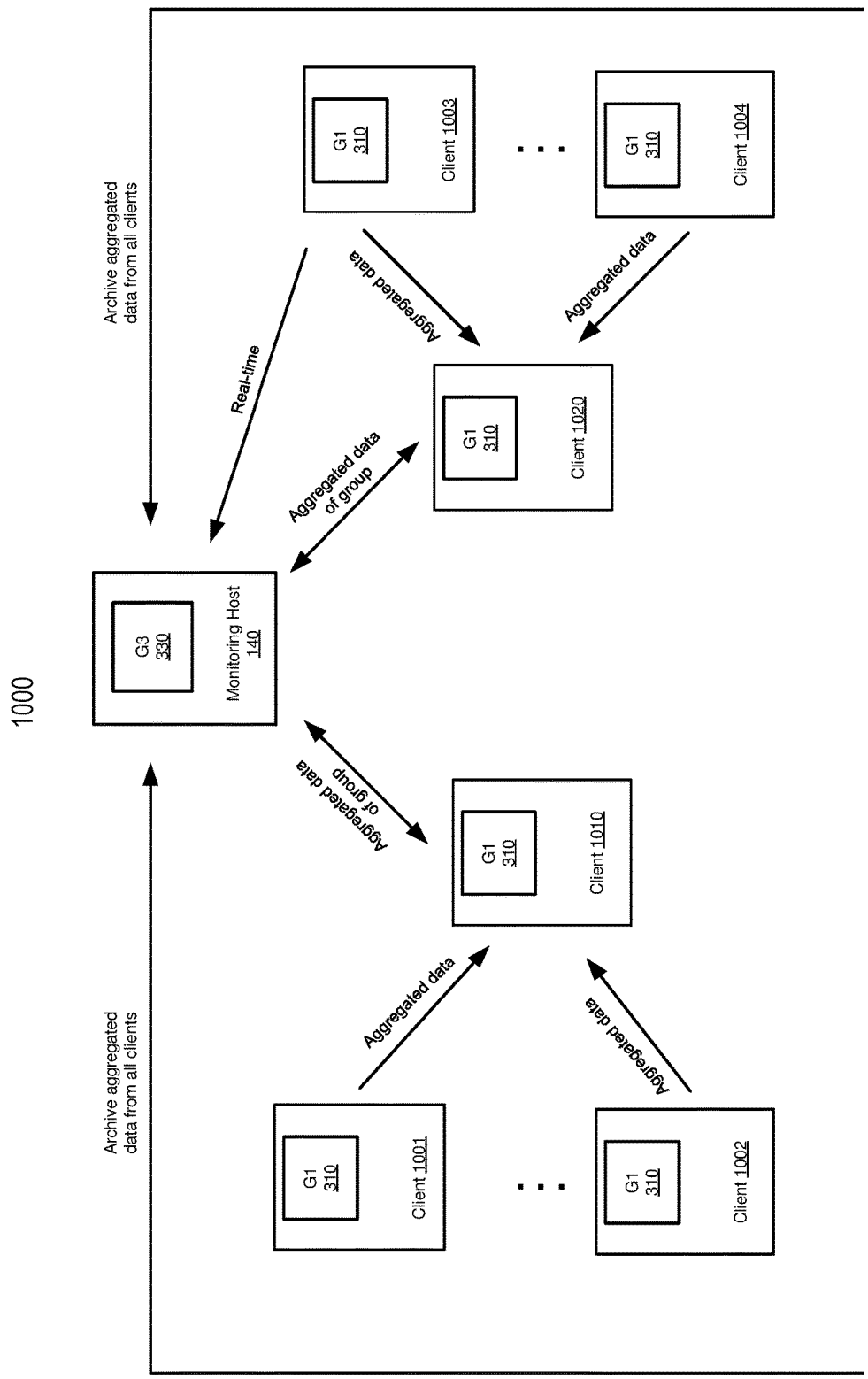
FIG. 10 is a block diagram illustrating a system for providing monitoring information in various time intervals according to one embodiment of the invention.

FIG. 10 is a block diagram illustrating a system for providing monitoring information in various time intervals according to one embodiment of the invention. In FIG. 10, system 1000 includes monitoring host 140 that is communicatively coupled to clients 1001-1002, 1003-1004, 1010 and 1020 (which in some embodiments may be the same or similar to clients 101-102 of FIG. 1). Each of clients 1001-1002, 1003-1004 and 1010-1020 may collect and aggregate resource information of the client into a log file in accordance with a sampling time (e.g., every minute), which may be locally stored within the client. The stored log file from each of clients 1001-1002 and 1003-1004 may be respectively transmitted to dedicated clients 1010 and 1020 at a transmission rate (e.g., every 15 minutes). Subsequently, monitoring host 140 may retrieve or receive the log files of clients 1001-1002, 1003-1004 and 1010-1020 via dedicated clients 1010 and 1020 for archiving, analyzing, and visually representing the information in the log files. In some embodiments, the monitoring host 140 may retrieve or receive the log files at a rate that is the same as the transmission rate. Data or information retrieved or received by monitoring host 140 at this rate may be referred to as "near-time data."

In some embodiments, a user may request (e.g., via the UI microservice in monitoring host 140) visual representation of monitoring information in real-time with respect to a specific system (e.g., any of clients 1001-1004 and 1010-1020), for example, if problems or issues are detected in the system. In this example, the user request is made with respect to client 1003. Accordingly, monitoring host 140 and client 1003 may communicate in real-time in a manner, as previously discussed with respect to FIG. 8. That is, in response to the user request, monitoring host 140 may send a request (e.g., POST request) to client 1003 with input parameters having a sampling time indicative of real-time, for example every one minute or less. In response to the input parameters, the microservices gather and aggregate resource information of client 1003 into a log file in real-time. As such, monitoring host 140 may retrieve or receive the log file from client 1003 and process the log file in real-time. As previously discussed with respect to FIG. 9, upon completion or at the end of the monitoring services, monitoring host 140 may retrieve or receive the log files from all clients within system 1000 (e.g., clients 1001-1004 and 1010 and 1020). Again, information from all log files may be archived into a database for analysis and visual representation.

Figure 11:
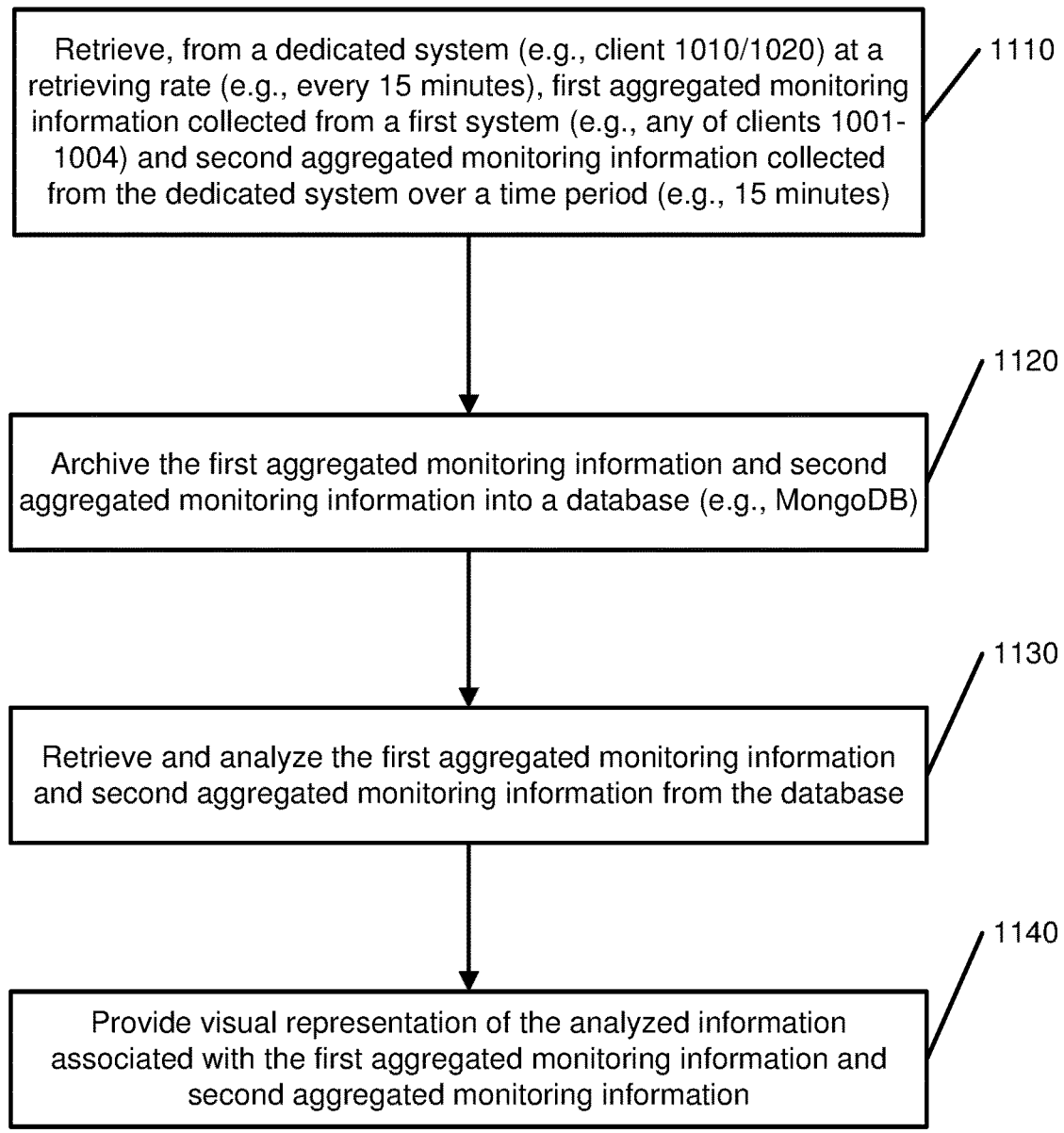
FIG. 11 is a flow diagram illustrating a further method to provide monitoring services of one or more data processing systems according to one embodiment of the invention.

FIG. 11 is a flow diagram illustrating a further method to provide monitoring services of one or more data processing systems according to one embodiment of the invention. Process 1100 may be performed by processing logic that includes hardware (e.g. circuitry, dedicated logic, etc.), software (e.g., embodied on a non-transitory computer readable medium), or a combination thereof. For example, process 1100 may be performed by monitoring host 140 of FIG. 1. Referring to FIG. 11, at block 1110, processing logic retrieves, from a dedicated system (e.g., client 1010 or 1020 of FIG. 10) at a retrieving rate (e.g., every 15 minutes), first aggregated monitoring information collected from a first system and second aggregated monitoring information collected from the dedicated system over a time period (e.g., 15 minutes). At block 1120, the processing logic archives the first aggregated monitoring information and second aggregated monitoring information into a database (e.g., MongoDB). At block 1130, the processing logic retrieves and analyzes the first aggregated monitoring information and second aggregated monitoring information from the database. At block 1140, the processing logic provides visual representation of the analyzed information associated with the first aggregated monitoring information and second aggregated monitoring information.

Figure 12:
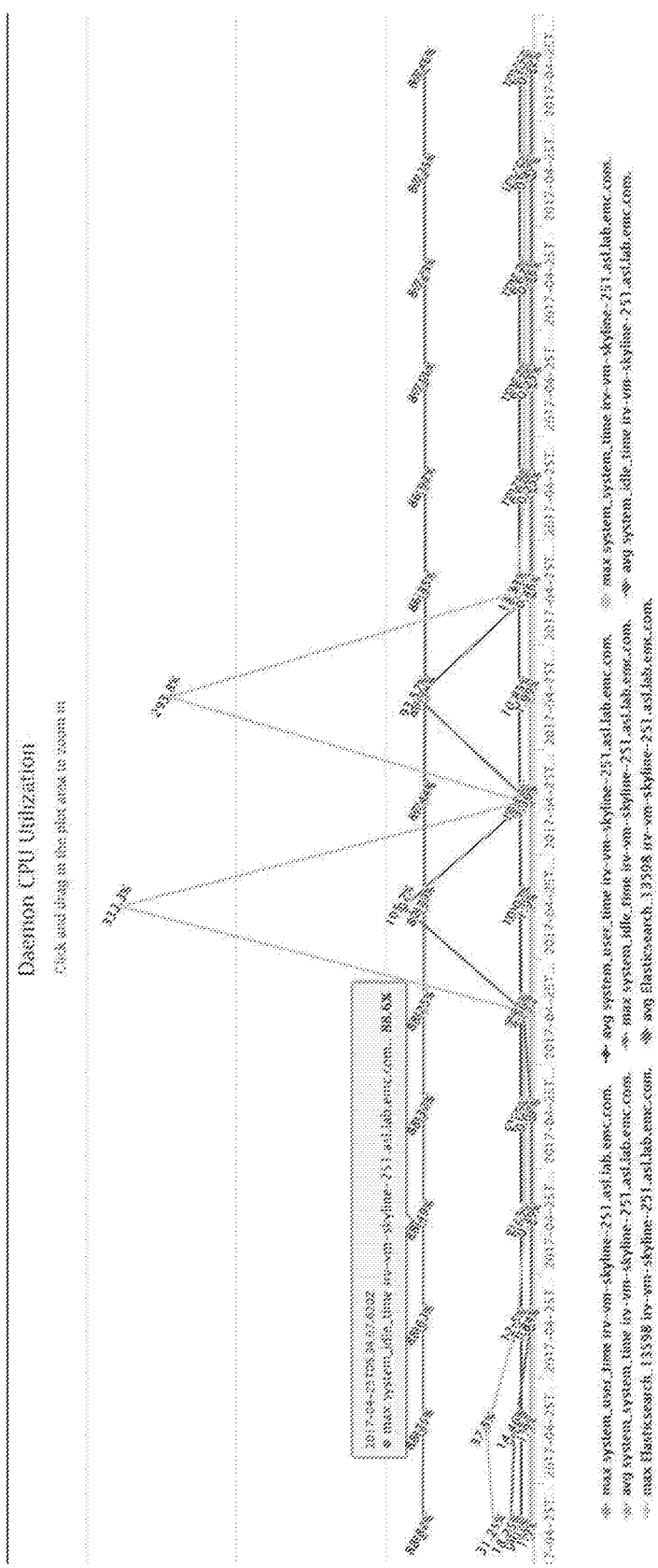
FIG. 12 illustrates an example of a user interface (UI) microservice according to one embodiment of the invention.

FIG. 12 illustrates an example of a user interface (UI) microservice according to one embodiment of the invention. In the example of FIG. 12, UI 1200 provides display of various graphs associated with CPU utilization of multiple processes running on a system (e.g., client or storage system). Although UI 1200 displays CPU utilization in this example, other monitoring information may be displayed, such as memory utilization, hard disk drives utilization, cache space, network throughput, and input/output (I/O) operations. In some embodiments, UI 1200 may also display monitoring information associated with multiple systems. Referring back to FIG. 12, as shown, the graphs show maximum and average CPU utilization of different processes from monitoring information (e.g., data in a log file of a client or storage system) retrieved over a time period (e.g., 15 minutes). Generally, UI 1200 displays monitoring information over a span of the time period, for example "near-time data" as previously discussed with respect to FIG. 10. However, in some embodiments, UI 1200 may display the monitoring information in real-time if requested by a user. At the end of the monitoring services, UI 1200 may, additionally or alternatively, display analyzed archived data, such that a user may view the data to recognize buildup pattern of a particular issue and help identify the root cause of the issue.

Note that some or all of the components as shown and described above (e.g., content store 115 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 13:
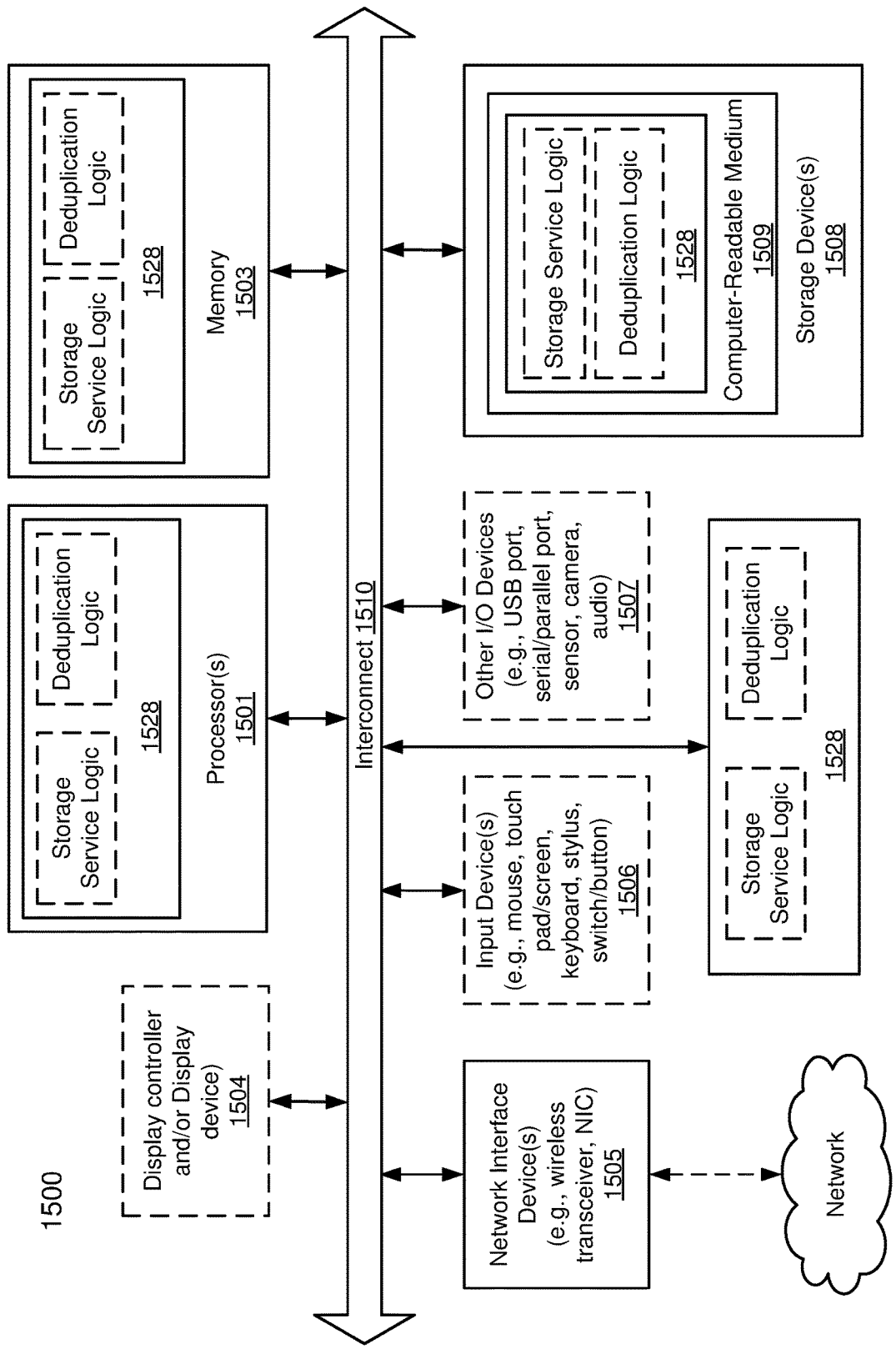
FIG. 13 is a block diagram illustrating an example of a data processing system which may be used with one embodiment of the invention.

FIG. 13 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

I/O devices 1507 may include an audio device. An audio device may include a speaker and/or a microphone to facilitate voice-enabled functions, such as voice recognition, voice replication, digital recording, and/or telephony functions. Other I/O devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for providing monitoring services of one or more data processing systems, the method comprising:

retrieving, from a dedicated system at a retrieving rate, first aggregated monitoring information collected from a first system and second aggregated monitoring information collected from the dedicated system over a time period, the first system and the dedicated system being monitored based on a microservice architecture instantiated in accordance with a predefined framework, the microservice architecture being segmented into a plurality of groups of microservices for a deployment, each of the plurality of groups of microservices being represented by a subset of the predefined framework that represents the microservice architecture;

archiving the first aggregated monitoring information and second aggregated monitoring information into a database;

retrieving and analyzing the first aggregated monitoring information and second aggregated monitoring information from the database; and providing, via a user interface microservice of the deployed plurality of groups of microservices, visual representation of the analyzed information associated with the first aggregated monitoring information and second aggregated monitoring information, wherein the visual representation includes a plurality of a plurality of graphs associated with a CPU utilization of a plurality processes of running on the dedicated system or the first system.

2. The method of claim 1, wherein the first system transmits the first aggregated monitoring information to the dedicated system at a transmission rate that is substantially equivalent to the retrieving rate.

3. The method of claim 2, further comprising:
retrieving, from the dedicated system at the retrieving rate, third aggregated monitoring information collected from a second system over the time period;
wherein the second system transmits the third aggregated monitoring information to the dedicated system at the transmission rate.

4. The method of claim 3, further comprising:
determining whether the monitoring services are complete;
if the monitoring services are complete,
retrieving, from the first system, fourth aggregated monitoring information collected from the first system over a duration of the monitoring services,
retrieving, from the dedicated system, fifth aggregated monitoring information collected from the dedicated system over the duration of the monitoring services, and
retrieving, from the second system, sixth aggregated monitoring information collected from the second system over the duration of the monitoring services.

5. The method of claim 4, further comprising:
providing visual representation of analyzed information associated with the fourth aggregated monitoring information, fifth aggregated monitoring information, and sixth aggregated monitoring information.

6. The method of claim 3, wherein the retrieving rate is every fifteen (15) minutes, and wherein the time period is 15 minutes.

7. The method of claim 1, further comprising:
in response to a user request to provide visual representation of monitoring information of the first system in real-time,
sending the first system a request with an input parameter having a sampling time indicative of real-time that configures one or more microservices in the first system to collect and aggregate monitoring information of the first system in real-time;
receiving real-time aggregated monitoring information from the first system; and
providing visual representation of analyzed information associated with the real-time aggregated monitoring information.

8. A non-transitory machine-readable medium having instructions stored therein, which when executed by a processor, cause the processor to perform operations of providing monitoring services of one or more data processing systems, the operations comprising:

retrieving, from a dedicated system at a retrieving rate, first aggregated monitoring information collected from a first system and second aggregated monitoring information collected from the dedicated system over a time period, the first system and the dedicated system being monitored based on a microservice architecture instantiated in accordance with a predefined framework, the microservice architecture being segmented into a plurality of groups of microservices for a deployment, each of the plurality of groups of microservices being represented by a subset of the predefined framework that represents the microservice architecture;

archiving the first aggregated monitoring information and second aggregated monitoring information into a database;

retrieving and analyzing the first aggregated monitoring information and second aggregated monitoring information from the database; and providing, via a user interface microservice of the deployed plurality of groups of microservices, visual representation of the analyzed information associated with the first aggregated monitoring information and second aggregated monitoring information, wherein the visual representation includes a plurality of a plurality of graphs associated with a CPU utilization of a plurality of processes running on the dedicated system or the first system.

9. The non-transitory machine-readable medium of claim 8, wherein the first system transmits the first aggregated monitoring information to the dedicated system at a transmission rate that is substantially equivalent to the retrieving rate.

10. The non-transitory machine-readable medium of claim 9, wherein the operations further comprise:
retrieving, from the dedicated system at the retrieving rate, third aggregated monitoring information collected from a second system over the time period;
wherein the second system transmits the third aggregated monitoring information to the dedicated system at the transmission rate.

11. The non-transitory machine-readable medium of claim 10,
determining whether the monitoring services are complete;
if the monitoring services are complete,
retrieving, from the first system, fourth aggregated monitoring information collected from the first system over a duration of the monitoring services,
retrieving, from the dedicated system, fifth aggregated monitoring information collected from the dedicated system over the duration of the monitoring services, and
retrieving, from the second system, sixth aggregated monitoring information collected from the second system over the duration of the monitoring services.

12. The non-transitory machine-readable medium of claim 11, the operations further comprise:
providing visual representation of analyzed information associated with the fourth aggregated monitoring information, fifth aggregated monitoring information, and sixth aggregated monitoring information.

13. The non-transitory machine-readable medium of claim 10, wherein the retrieving rate is every fifteen (15) minutes, and wherein the time period is 15 minutes.

14. The non-transitory machine-readable medium of claim 8, wherein the operations further comprise:

in response to a user request to provide visual representation of monitoring information of the first system in real-time,
sending the first system a request with an input parameter having a sampling time indicative of real-time that configures one or more microservices in the first system to collect and aggregate monitoring information of the first system in real-time;
receiving real-time aggregated monitoring information from the first system; and
providing visual representation of analyzed information associated with the real-time aggregated monitoring information.

15. A data processing system, comprising:
a processor; and
a memory coupled to the processor to store instructions, which when executed by the processor, cause the processor to perform operations, the operations comprising:
retrieving, from a dedicated system at a retrieving rate, first aggregated monitoring information collected from a first system and second aggregated monitoring information collected from the dedicated system over a time period, the first system and the dedicated system being monitored based on a microservice architecture instantiated in accordance with a predefined framework, the microservice architecture being segmented into a plurality of groups of microservices for a deployment, each of the plurality of groups of microservices being represented by a subset of the predefined framework that represents the microservice architecture;
archiving the first aggregated monitoring information and second aggregated monitoring information into a database;
retrieving and analyzing the first aggregated monitoring information and second aggregated monitoring information from the database; and
providing, via a user interface microservice of the deployed plurality of groups of microservices, visual representation of the analyzed information associated with the first aggregated monitoring information and second aggregated monitoring information, wherein the visual representation includes a plurality of a plurality of graphs associated with a CPU utilization of a plurality of processes running on the dedicated system or the first system.

16. The data processing system of claim 15, wherein the first system transmits the first aggregated monitoring information to the dedicated system at a transmission rate that is substantially equivalent to the retrieving rate.

17. The data processing system of claim 16, wherein the operations further comprise:
retrieving, from the dedicated system at the retrieving rate, third aggregated monitoring information collected from a second system over the time period;
wherein the second system transmits the third aggregated monitoring information to the dedicated system at the transmission rate.

18. The data processing system of claim 17, wherein the operations further comprise:
determining whether the monitoring services are complete;
if the monitoring services are complete,
retrieving, from the first system, fourth aggregated monitoring information collected from the first system over a duration of the monitoring services,
retrieving, from the dedicated system, fifth aggregated monitoring information collected from the dedicated system over the duration of the monitoring services, and
retrieving, from the second system, sixth aggregated monitoring information collected from the second system over the duration of the monitoring services.

19. The data processing system of claim 18, wherein the operations further comprise:
providing visual representation of analyzed information associated with the fourth aggregated monitoring information, fifth aggregated monitoring information, and sixth aggregated monitoring information.

20. The data processing system of claim 15, wherein the operations further comprise:
in response to a user request to provide visual representation of monitoring information of the first system in real-time,
sending the first system a request with an input parameter having a sampling time indicative of real-time that configures one or more microservices in the first system to collect and aggregate monitoring information of the first system in real-time;
receiving real-time aggregated monitoring information from the first system; and
providing visual representation of analyzed information associated with the real-time aggregated monitoring information.

* * * * *